United States Patent
Mukai et al.

(10) Patent No.: US 11,537,827 B2
(45) Date of Patent: Dec. 27, 2022

(54) PREVIEW IMAGE DISPLAY GENERATED BY COMBINING RASTER IMAGE DATA OF COLOR AND SPECIAL COLOR INKS

(71) Applicant: SEIKO EPSON CORPORATION, Tokyo (JP)

(72) Inventors: Tomohiro Mukai, Shiojiri (JP); Fumio Tokutomi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/444,703

(22) Filed: Aug. 9, 2021

(65) Prior Publication Data

US 2022/0044085 A1 Feb. 10, 2022

(30) Foreign Application Priority Data

Aug. 10, 2020 (JP) .............................. JP2020-135471

(51) Int. Cl.
| | | |
|---|---|---|
| *G06K 15/02* | (2006.01) | |
| *G06K 15/10* | (2006.01) | |
| *G06K 15/00* | (2006.01) | |
| *H04N 1/00* | (2006.01) | |
| *H04N 1/60* | (2006.01) | |
| *H04N 1/52* | (2006.01) | |

(52) U.S. Cl.
CPC ....... *G06K 15/1867* (2013.01); *G06K 15/005* (2013.01); *G06K 15/102* (2013.01); *G06K 15/1852* (2013.01); *G06K 15/1881* (2013.01); *G06K 15/1882* (2013.01); *H04N 1/0044* (2013.01); *H04N 1/00411* (2013.01); *H04N 1/52* (2013.01); *H04N 1/6011* (2013.01)

(58) Field of Classification Search
CPC .. H04N 1/0044–00461; G06K 15/1882–1885; G06F 3/1208; G06F 3/1256
See application file for complete search history.

(56) References Cited

U.S. PATENT DOCUMENTS

| | | | | |
|---|---|---|---|---|
| 7,064,858 B2* | 6/2006 | Iwai | ...................... | G06K 15/02 715/764 |
| 8,472,079 B2* | 6/2013 | Miyake | ................ | H04N 1/6072 358/518 |
| 8,699,043 B2* | 4/2014 | Gotoh | ................ | H04N 1/00482 382/168 |
| 9,521,281 B2* | 12/2016 | Gotoh | .................. | H04N 1/0044 |
| 2019/0384551 A1 | 12/2019 | Miyasaka | | |
| 2022/0043615 A1* | 2/2022 | Mukai | .................. | G06F 3/1207 |

FOREIGN PATENT DOCUMENTS

JP 2019-220838 A 12/2019

* cited by examiner

*Primary Examiner* — Scott A Rogers
(74) *Attorney, Agent, or Firm* — Workman Nydegger

(57) ABSTRACT

An image processing device in which a display section is caused to display a preview image for printing. The image processing device includes a processing section configured to generate the preview image obtained by converting raster image data of each of ink colors of color inks or special color inks into an RGB bitmap format, and a display controller configured to cause the display section to display the generated preview.

8 Claims, 7 Drawing Sheets

PREVIEW IMAGE DISPLAY GENERATED BY COMBINING RASTER IMAGE DATA OF COLOR AND SPECIAL COLOR INKS

The present application is based on, and claims priority from JP Application Serial Number 2020-135471, filed Aug. 10, 2020, the disclosure of which is hereby incorporated by reference herein in its entirety.

BACKGROUND

1. Technical Field

The present disclosure relates to an image processing device, a preview image display method, and a storage medium storing a preview image display program.

2. Related Art

In the related art, display of a preview image before printing is performed. In JP-A-2019-220838 describes a method for displaying, for a print job including multiple image layers, a preview image obtained by overlaying images in the printing order of the multiple image layers.

However, techniques in the related art are required to be compatible with file formats having layer information, transparent information, and the like.

SUMMARY

According to an aspect of the present disclosure, an image processing device in which a display section is caused to display a preview image for printing includes a processing section configured to generate the preview image obtained by converting raster image data of each of ink colors of color inks or special color inks into an RGB bitmap format, and a display controller configured to cause the display section to display the generated preview image.

According to another aspect of the present disclosure, a preview image display method for causing a display section to display a preview image for printing includes generating the preview image by converting raster image data of an ink color of a color ink or a special color ink into an RGB bitmap format, and causing the display section to display the generated preview image.

According to a further aspect of the present disclosure, a non-transitory computer-readable storage medium stores a preview image display program that causes a computer to realize a function of causing a display section to display a preview image for printing. The program causes the computer to function as a processing section configured to generate the preview image obtained by converting raster image data of an ink color of a color ink or a special color ink into an RGB bitmap format, and a display controller configured to cause the display section to display the generated preview image.

DESCRIPTION OF EXEMPLARY EMBODIMENTS

Hereinafter, an embodiment of the present disclosure will be described in the following order.
1. Configuration of Print System
1-1. Configuration of Print Job Generating device
1-2. Configuration of Image Forming Device
2. Print Job Generating Process
3. Print Process
3-1. Preview Image Generating Process
4. Other Embodiments

1. Configuration of Print System

Figure 1:
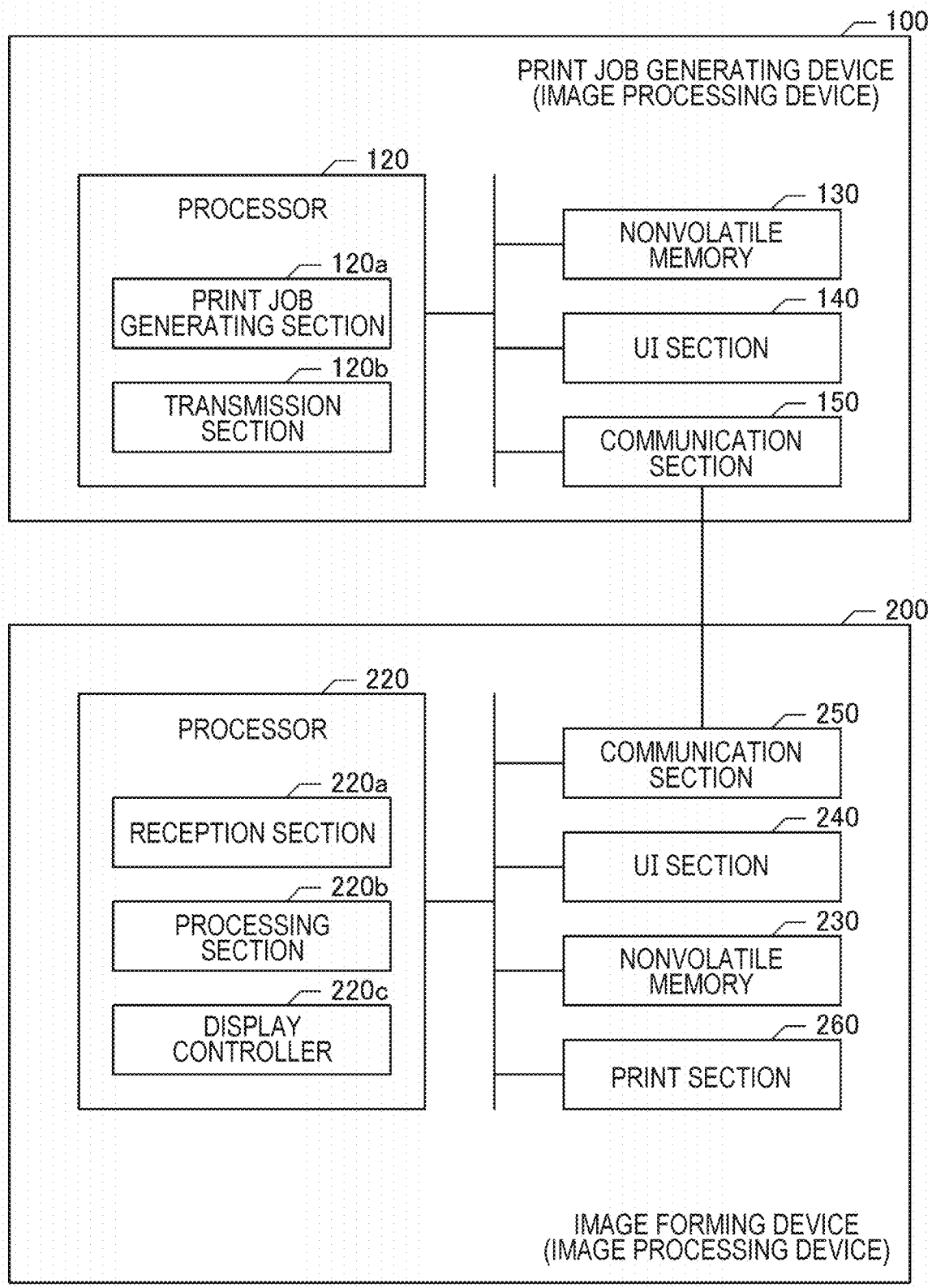
FIG. 1 is a block diagram illustrating a configuration of a print system.

FIG. 1 is a block diagram illustrating a configuration of a print system according to an embodiment of the present disclosure. The print system includes a print job generating device 100 and an image forming device 200. The print job generating device 100 is capable of communicating with the image forming device 200, and a print job generated by the print job generating device 100 is transmitted to the image forming device 200. In this embodiment, the image forming device 200 is a so-called printer that executes printing based on a received print job and corresponds to an image processing device. In this embodiment, the image forming device 200 may display a preview image generated based on a print job before execution of printing.

The image forming device 200 of this embodiment may perform printing using, in addition to cyan (C), magenta (M), yellow (Y), and black (K), special color inks including white (Wh) and varnish (Vr). The color inks are used when colors (chromatic color and achromatic color) other than a color of a print medium are to be represented. The special color ink is used to represent a color that may not be represented only by the color inks or to perform printing of a specific purpose. Examples of the specific purpose include base coating and surface coating. In this specification, a group including at least one ink color is referred to as a "version". The image forming device may display preview images of individual versions and an entire preview image obtained by combining all the versions. In this embodiment, examples of the version include a color version including cyan, magenta, yellow, and black, a white version, and a varnish version.

1-1. Configuration of Print Job Generating Device

The print job generating device 100 includes a processor 120, a communication section 150, a nonvolatile memory 130, and a user interface (UI) section 140. The processor 120 includes a central processing unit (CPU), a read only memory (ROM), and a random access memory (RAM), not illustrated, and controls the sections included in the print job generating device 100 by executing various programs recorded in the nonvolatile memory 130. Note that the processor 120 may include a single chip or a plurality of chips.

The UI section 140 includes a display (a display section) that displays an arbitrary image. The UI section 140 further includes a keyboard and a touch pad. The processor 120 may obtain content of an input performed in accordance with an operation on a keyboard or a touch pad of the UI section 140. The communication section 150 includes a communication interface used to perform communication with an external apparatus in accordance with various wired or wireless communication protocols. The print job generating device 100 is capable of communicating with the image forming device 200 through the communication section 150. Note that the keyboard, a mouse, and the display are coupled through the communication section 150, and the processor 120 may perform input and output of various information through these devices.

In this embodiment, a user of the print job generating device 100 instructs generation of a print job by operating the UI section 140. Specifically, the user may instruct generation of a print job by selecting a file to be printed and a version. To realize this function, the processor 120 executes a print job generating program, not illustrated, recorded in the nonvolatile memory 130. When the print job generating program is executed, the processor 120 functions as a print job generating section 120a and a transmission section 120b.

Figure 2:
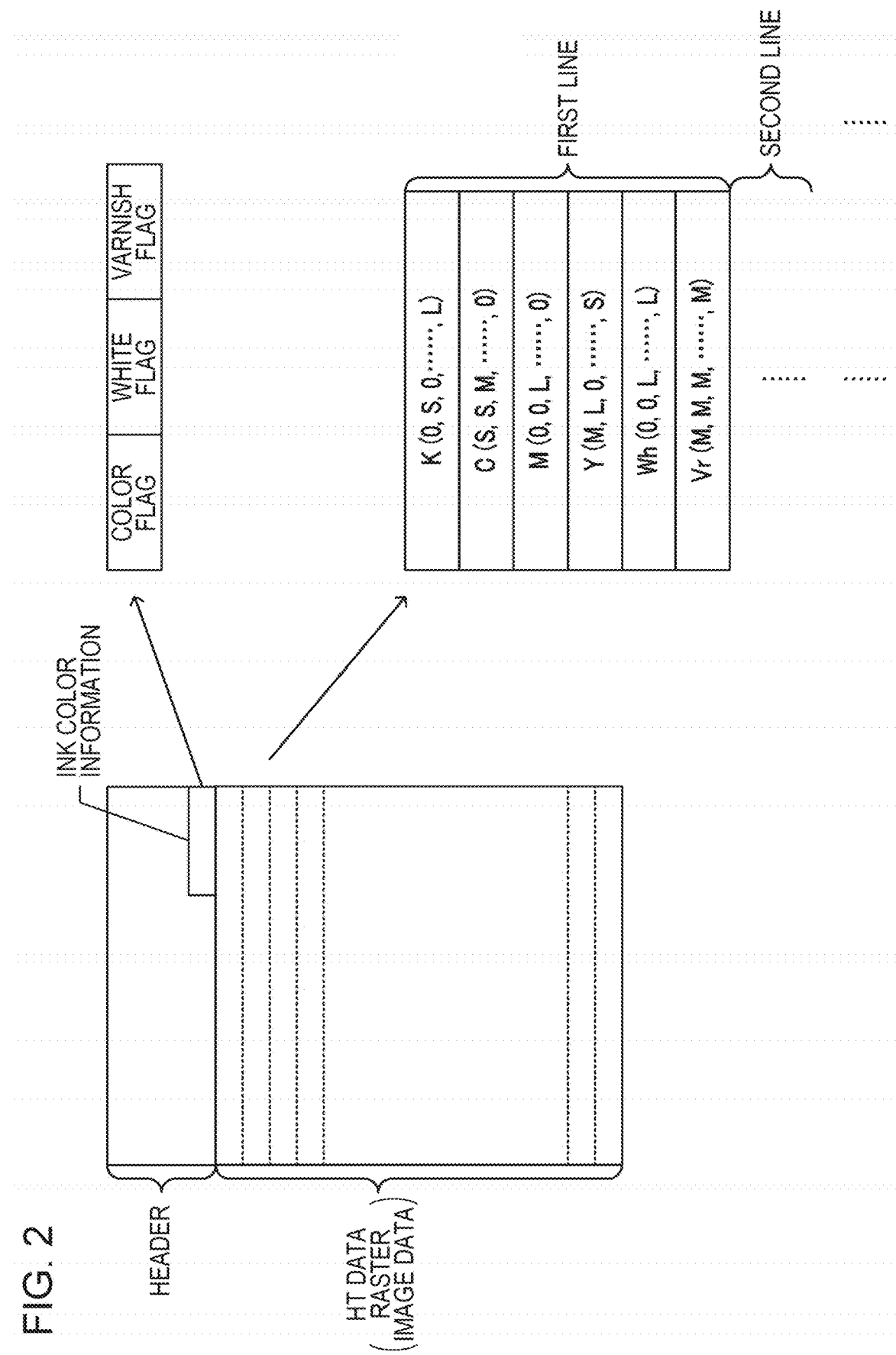
FIG. 2 is a diagram illustrating a configuration of a prn file.

The print job generating section 120a is a program module that causes the processor 120 to realize a function of generating a print job including ink color information indicating ink colors to be used in printing and raster image data for individual colors. In this embodiment, a print job is generated in a file format having an extension "prn". The prn file includes, as illustrated in FIG. 2, a header positioned in a head of the file and raster image data following the header. In this embodiment, the raster image data included in the prn file is halftone data generated by a halftone process.

The halftone data includes a value indicating whether an ink droplet is to be ejected to each pixel. In this embodiment, a size of the ink droplet to be ejected may be represented by three sizes, that is, large, middle, and small. Specifically, a halftone value of this embodiment may be one of four values including a value indicating that an ink droplet is not to be ejected, a value indicating that a small ink droplet is to be ejected, a value indicating that a middle ink droplet is to be ejected, and a value indicating that a large ink droplet is to be ejected.

The processor 120 obtains a file designated as a print target by means of the function of the print job generating section 120a and receives designation of a version to be printed. The file to be printed may have one of various formats. Furthermore, the file to be printed may be divided into a plurality of files for respective versions, and the plurality of files may be designated as print targets. The description is continued while it is assumed that, in this embodiment, as a file of an image to be printed, a single file including gradation values of pixels of a color channel represented by RGB three colors in a single image, gradation values of pixels of a white channel serving as a special color, that is, a spot color, and gradation values of pixels of a varnish channel serving as a special color is obtained as a print target.

A user who instructs generation of a print job designates a version to be printed of a file to be printed. In this embodiment, the user may specify all the color channel, the white channel, and the varnish channel or one or two of the color channel, the white channel, and the varnish channel as a version to be printed. Colors of the color channel are represented on a print medium by inks of C, M, Y, and K in this embodiment. Furthermore, a color of the white channel is represented by a white ink, and a color of the varnish channel is represented by a varnish ink. Accordingly, designation of the version to be printed performed by the user may be rephrased by designation of an ink color to be used in printing performed by the user.

When the designation of the version to be printed is obtained, the processor 120 generates a header of the prn file. The header includes ink color information indicating an ink color used in printing of the prn file. In this embodiment, the ink color information includes a flag indicating whether a color ink is to be used, a flag indicating whether a white ink is to be used, and a flag indicating whether a varnish ink is to be used. The processor 120 sets designation of a version to be printed performed by the user as values of the three flags described above by means of a function of the print job generating section 120a. Specifically, when a color version is designated as a version to be printed, the processor 120 sets a value indicating that a color ink is to be used to the flag, and otherwise, sets a value indicating that the color ink is not to be used to the flag. As for the flag indicating whether a white ink is to be used and the flag indicating whether a varnish ink is to be used, a value is similarly set in accordance with a determination as to whether the white version or the varnish version has been designated.

When the generation of the header is terminated, the processor 120 generates ink amount data of the version designated as a print target. When a color version is designated as the print target, for example, a CMYK color conversion process is performed on gradation values of R, G, and B channels of a print target image so as to generate ink amount data of C, M, Y, and K inks. The ink amount data is represented as gradation values of multi-gradation, for example, 256 gradations, for individual pixels. When the version designated as the print target includes white or varnish, the processor 120 generates ink amount data of white using gradation values of white and generates ink amount data of varnish using gradation values of varnish.

Subsequently, the processor 120 generates halftone data using the ink amount data. The processor 120 obtains halftone data of individual C, M, Y, and K inks by performing a halftone process on the ink amount data of the C, M, Y, and K inks. Furthermore, the processor 120 performs a halftone process on the gradation values of the white channel so as to obtain halftone data of white. Furthermore, the processor 120 performs a halftone process on the gradation values of the varnish channel so as to obtain halftone data of varnish. The halftone process is performed by a dither method, an error diffusion method, or the like.

When the halftone data of the individual ink colors are obtained, the processor 120 arranges values obtained after the halftone process performed on lines of the individual ink colors for individual lines of the image as illustrated in FIG. 2. Note that the processor 120 does not perform the halftone process on an ink color of a version that is not specified as the print target and arranges 0 that is a halftone value indicating that ink is not ejected in this embodiment. The processor 120 arranges values obtained after the halftone process performed on the individual ink colors or 0 to a last line of the image so as to generate a prn file including the header and the halftone data as illustrated in FIG. 2.

The transmission section 120b is a program module that causes the processor 120 to realize a function of transmitting a generated print job to the image forming device 200. The processor 120 transmits the prn file through the communication section 150 to the image forming device 200 by means of a function of the transmission section 120b in response to an instruction of the user of the print job generating device 100.

1-2. Configuration of Image Forming Device

The image forming device 200 includes a processor 220, a nonvolatile memory 230, a UI section 240, a communication section 250, and a print section 260. The processor 220 includes a CPU, a ROM, and a RAM, not illustrated, and controls the sections included in the image forming device 200 by executing various programs recorded in the nonvolatile memory 230. Note that the processor 220 may be constituted by a single chip or a plurality of chips. Furthermore, an ASIC may be employed instead of the CPU or the CPU and the ASIC may cooperate with each other.

The communication section 250 includes a communication interface used to perform communication with an external apparatus in accordance with various wired or wireless communication protocols. Furthermore, the communication section 250 includes an interface for communicating with various removable memories attached to the image forming device 200. The image forming device 200 may communicate with the print job generating device 100 through the communication section 250.

The print section 260 may execute printing on various types of print medium in an ink jet method in accordance with an instruction issued by the processor 220 in this embodiment. The print section 260 includes a transport mechanism that transports a print medium and a print head that ejects ink droplets to a print medium. The print head in this embodiment may eject six colors of ink, that is, C, M, Y, K, Wh, and Vr. Furthermore, in this embodiment, three sizes of ink droplets, that is, large ink droplets, middle ink droplets, and small ink droplets, may be ejected from nozzles of the print head.

The UI section 240 includes a touch panel display, various keys, and various switches. The touch panel display includes a display panel for displaying various information under control of the processor 220 and a touch detection panel superposed on the display panel and detects a touch operation performed by a human finger or the like. The processor 220 may obtain content of an operation performed by the user through the UI section 240. Furthermore, the processor 220 may display various information on the display of the UI section 240 so as to make a notification for the user.

The processor 220 may execute a preview image display program, not illustrated, recorded in the nonvolatile memory 230. The preview image display program causes the processor 220 to realize a function of displaying a preview of an image of a print target included in a print job. When the preview image display program is executed, the processor 220 functions as a reception section 220a, a processing section 220b, a display controller 220c.

The reception section 220a is a program module that causes the processor 220 to realize a function of receiving a print job transmitted from the print job generating device 100. The processor 220 obtains a prn file transmitted from the print job generating device 100 through the communication section 250 and stores the prn file in the nonvolatile memory 230 by means of the function of the reception section 220a. In this embodiment, when the user of the image forming device 200 selects the prn file recorded in the nonvolatile memory 230 by operating the UI section 240, a process of the processing section 220b is activated.

The processing section 220b has a determining function and a preview image generating function. The determining function determines ink colors to be used in printing and ink colors not to be used in printing based on ink color information included in a print job. The preview image generating function generates a preview image obtained by converting raster image data of individual ink colors of color inks and special color inks into an RGB bitmap form. In this embodiment, the preview image display program generates a preview image of a version to be printed but does not generate a preview image of a version not to be printed.

Therefore, the processor 220 determines a type of a version to be printed based on the ink color information in the header by means of the determining function of the processing section 220b. The processor 220 reads the prn file from a top from the nonvolatile memory 230 into the RAM by means of the determining function of the processing section 220b. As described above, the prn file includes the header before the halftone data. The processor 220 analyzes the header so as to obtain the ink color information illustrated in FIG. 2. The processor 220 determines a version to be printed, that is, an ink color to be used in printing in accordance with the ink color information. The processor 220 determines a version to be printed among a color version including C, M, Y, and K, a white version, and a varnish version.

Note that, if ink color information is not included in the print job, the halftone data of the individual ink colors are subjected to all-pixel analysis to determine whether the version is to be printed, that is, whether the version is for displaying a preview image and determine whether at least one pixel in which ink is to be ejected is included for each ink color. In this case, a period of time required for the determination of the version to be printed is increased. However, according to this embodiment, the version to be printed may be determined based on the ink color information without determining whether ink is to be ejected to each pixel based on the halftone data.

Figure 3:
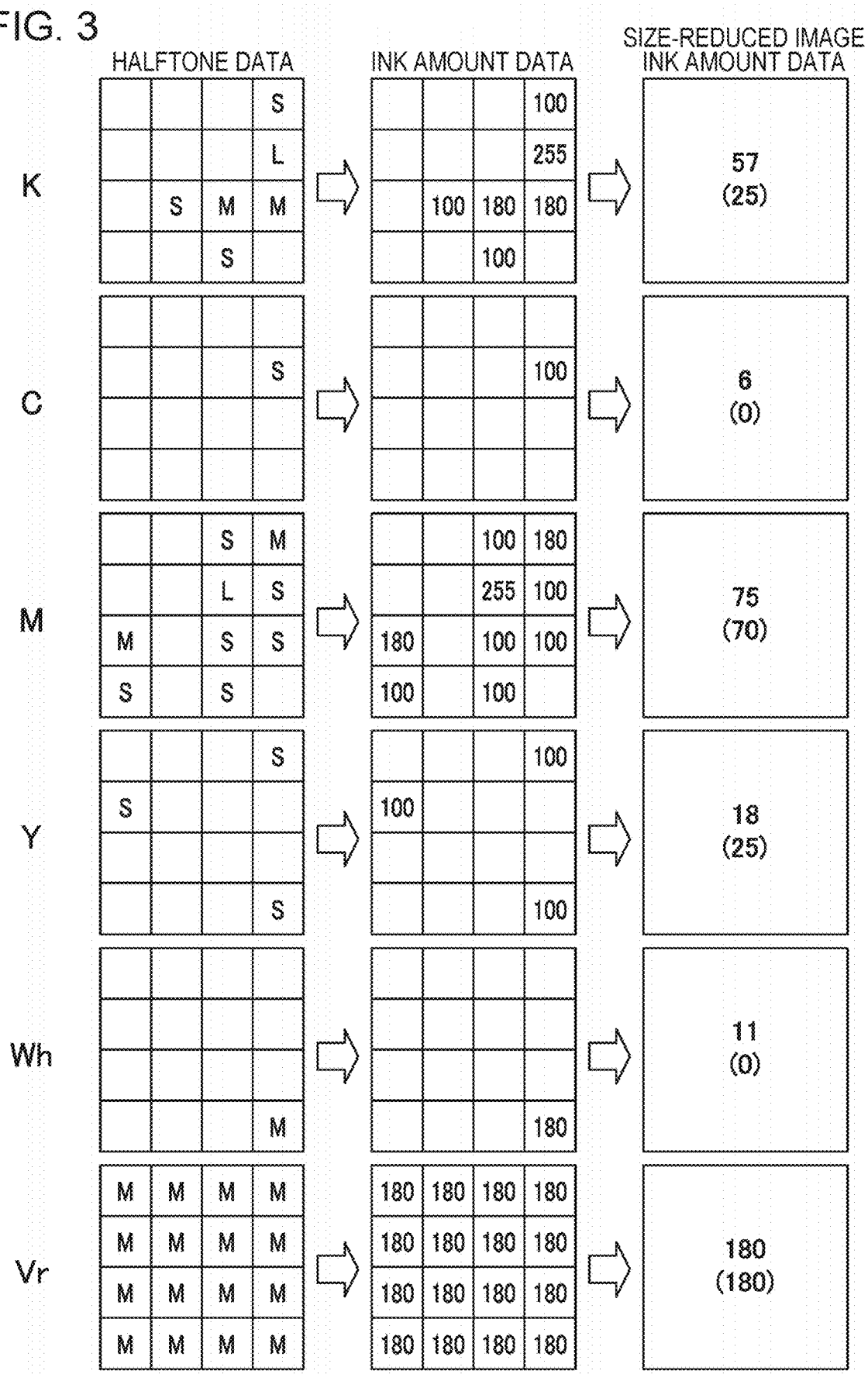
FIG. 3 is a diagram illustrating image processing to be performed for generating a preview image.

Next, the preview image generating function of the processing section 220b will be described. The processor 220 assigns R, G, and B values to the individual pixels based on the raster image data of the individual ink colors (the halftone data in this embodiment) by means of the function of the processing section 220b. Specifically, first, the processor 220 reads the halftone data stored after the header in the prn file in the nonvolatile memory 230 in turn from the top. An amount of data to be read at a time corresponds to the number of lines required for generating RGB raster image data for a predetermined number of lines of a preview image, for example. FIG. 3 is a diagram illustrating an example of transform of data subjected to conversion from halftone data into ink amount data and a size-reducing process. In the halftone data illustrated in FIG. 3, for convenience of description, values in ranges of 4 by 4 pixels are represented for individual ink colors. Note that a data configuration of the halftone data in the prn file is as illustrated in FIG. 2. In the halftone data illustrated in FIG. 3, S, M, and L indicate pixels to which small, medium, and large ink droplets are ejected, respectively, and blank pixels indicate that ink is not ejected to the pixels.

The processor 220 converts halftone data into ink amount data. For example, in this embodiment, an ink amount is represented by 256 gradations and S is converted into 100, M into 180, and L into 255. 0 is assigned to pixels to which ink is not ejected. In the ink amount data of the individual ink colors illustrated in a center column of FIG. 3, blank pixels indicate that 0 is assigned. After converting the halftone data into the ink amount data, the processor 220 reduces a size of the image for preview display. In the example of FIG. 3, a matrix of 4 pixels by 4 pixels is reduced to 1 pixel. Specifically, the processor 220 divides a sum of the ink amount data of the 4 by 4 pixels by 16 so as to obtain an average value serving as ink amount data of the one pixel obtained after the size reduction. In the column of the ink amount data of the size-reduced image in FIG. 3, numbers on an upper side indicate values calculated in this way. Note that the reduction to ⅟16 in FIG. 3 is merely an example. A reduction rate is determined in accordance with the number of vertical pixels and horizontal pixels in the raster image in the prn file, the number of vertical pixels and horizontal pixels in the image for preview display, and the like.

Note that, although the ink amount data after the size reduction are obtained by reading all lines in turn from the nonvolatile memory 230 one by one and dividing a sum of the ink amount data of adjacent (n×n) pixels by (n×n) pixels in the example described above, pixels to be read may be extracted in the vertical direction of the image, for example. Specifically, halftone data of K, C, M, Y, Wh, and Vr (refer to FIG. 2) in an m-th line may be read and an average value of ink amount data of adjacent n pixels in the horizontal direction of the halftone data may be determined as ink amount data of the one pixel obtained after the size reduction. Thereafter, an m+1-th line to m+n−1-th line are skipped, and then halftone data of m+n-th line is read. Then, in the m+n-th line, ink amount data after the size reduction may be calculated using ink amount data of adjacent n pixels in the horizontal direction as described above. In the column of the ink amount data of the size-reduced image in FIG. 3, numbers on a lower side indicate values calculated in this way. Accordingly, a period of time required for reading the halftone data from the nonvolatile memory 230 may be reduced resulting in reduction of a period of time required for the preview image generation.

When generating the ink amount data after the size reduction of the ink colors corresponding to the version to be printed, the processor 220 converts an entire preview image obtained by combining all versions to be printed and preview images of the individual versions to be printed into raster image data of an RGB format (bitmap data). This conversion may be performed by a calculation using a conversion function or LUT. In this embodiment, an example of the conversion using LUT will be described. For example, a color LUT obtained by associating representative values of (K, C, M, Y) with (R, G, B), a white LUT obtained by associating (R, G, B) with individual representative values of (Wh), and a varnish LUT obtained by associating (R, G, B) with individual representative values of (Vr) are recorded in the nonvolatile memory 230.

Since colors represented by a white ink and a varnish ink are white, an achromatic color, a color close to an achromatic color, or transparent, even if white or a color that is almost transparent is reproduced in a preview image, it is difficult for the user to determine portions where the white ink and the varnish ink are used. In particular, when all the versions are overlapped with each other, it is difficult to determine the portions where the white ink and the varnish ink are used. Therefore, in this embodiment, colors different from colors of the special color inks themselves in a printed state are assigned to the special color inks of white and varnish, and the special color inks of white and varnish are represented by RGB values. According to this embodiment, a color of the white ink is represented by an achromatic color (gray) of lower lightness than white. Accordingly, (R, G, B) obtained after the conversion using the white LUT is represented as follows: R=G=B. The gray representing the white ink may also be represented to have a gradation within a certain range in accordance with a value of the ink amount data of white. In the preview image, the color of the white ink is preferably distinguished from white that is often used as a color of a print medium, and when the ink amount data of white has a maximum value, gradation values of R, G, and B after the conversion are preferably smaller than the maximum value. The color of the varnish ink is represented by pale yellow that is recognized by eyes as gloss after printing in this embodiment. In this case, for example, a value obtained by converting a color having lightness changed in accordance with an ink amount of varnish in a specific color hue and specific saturation corresponding to pale yellow into RGB is recorded in the varnish LUT. Accordingly, also the varnish version may be represented to have a gradation within a certain range in accordance with a value of the ink amount data of varnish. Note that, as another embodiment, a color of the varnish ink may be represented by a color of a housing of an ink cartridge of varnish. The special color of an achromatic color or transparent is preferably different from a background color so that the special color is easily distinguished from a background of a preview image in a preview screen described below.

The processor 220 generates an entire preview image and preview images of individual versions based on versions to be processed. First, an example in which color, white, varnish are all print targets will be described. The processor 220 generates an entire preview image of an RGB bitmap format based on the ink amount data of the color ink and the ink amount data of the white ink and the varnish ink that are the special color inks. Specifically, the processor 220 calculates (R, G, B) corresponding to (K, C, M, Y), (R, G, B) corresponding to (Wh), and (R, G, B) corresponding to (Vr) using the three LUTs described above and an interpolation calculation. The processor 220 multiplies the obtained three (R, G, B)s by corresponding coefficients s, t, and u (s+t+u=1) determined in advance and adding the resultant (R, G, B)s to one another so that (R, G, B) is obtained by combining all the color version, the white version, and the varnish version. In this way, the processor 220 generates an entire preview image. Furthermore, the processor 220 generates preview images of a bitmap format of RGB for individual groups having at least one ink color, that is, for individual versions. Specifically, the processor 220 generates a preview image of the color version using (R, G, B) obtained by conversion from (K, C, M, Y) using the color LUT. Furthermore, the processor 220 generates a preview image of the white version using (R, G, B) obtained by conversion from (Wh) using the white LUT. Moreover, the processor 220 generates a preview image of the varnish version using (R, G, B) obtained by conversion from (Vr) using the varnish LUT. Note that a preview image obtained by combining the color version and the white version, a preview image obtained by combining the white version and the varnish version, and a preview image obtained by combining the varnish version and the color version may also be generated.

Note that an LUT in which a representative value of (K, C, M, Y, Wh, Vr) is associated with (R, G, B) is recorded in the nonvolatile memory 230, and (R, G, B) may be obtained using arbitrary values of (K, C, M, Y, Wh, Vr) by performing an interpolation calculation using the LUT. For example, (K, C, M, Y, 0, 0) may be converted into (R, G, B) using the LUT so that a preview image of the color version is generated. For example, (0, 0, 0, 0, Wh, 0) may be converted into (R, G, B) using the LUT so as to generate a preview image of the white version is generated.

Next, instead of an example in which all the color version, the white version, and the varnish version are print targets, an example in which only one or some of the color version, the white version, and the varnish version are print targets will be described. For example, when the color version and the white version are print targets, the processor 220 generates three preview images, that is, an entire preview image obtained by combining the color version and the white version, a preview image of the color version, and a preview image of the white version. Furthermore, when only the varnish version is a print target, for example, the processor 220 generates a preview image of the varnish version. In this case, the preview image of the varnish version is also used as an entire preview image.

The processor 220 generates a general file of a BMP format using the generated preview image. Specifically, the processor 220 generates one file for one preview image. For example, a BMP file indicating the entire preview image, a BMP file indicating the preview image of the color version, and a BMP file indicating the preview image of the white version are generated. The files of the BMP format has a data configuration including a header section and an image data section. The image data section includes raster image data of an RGB format. A configuration of the header section is based on the BMP format and includes information on the numbers of pixels in vertical and horizontal directions of an image indicated by the raster image data included in the image data section and the number of colors per pixel. According to this embodiment, a general file of the BMP format may be generated for preview display. When compared with the configuration in which a preview image is displayed using a file of a file format including layer information, the configuration in which a preview image is displayed using a file of a BMP format according to this embodiment does not require complicated processes and a period of time required for display may be reduced.

The display controller 220c has a function of displaying a preview image generated by the function of the processing section 220b in a display section. Specifically, the processor 220 displays a preview image indicated by halftone data of ink colors used in printing in the display section based on a result of a determination performed by the processing section 220b. When the generation of the preview image by means of the preview image generating function of the processing section 220b is terminated, the processor 220 displays the preview image in a display of the UI section 240 by means of a function of the display controller 220c. In this embodiment, the processor 220 first displays the entire preview image.

Figure 4A:
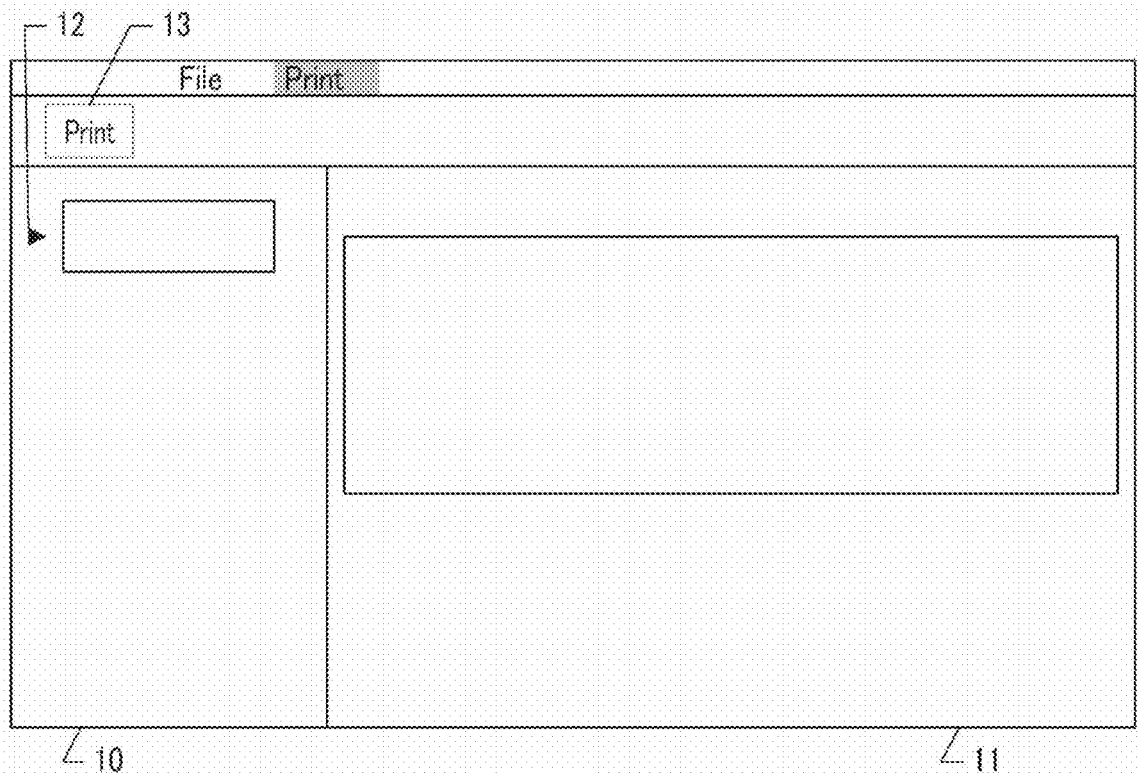
FIGS. 4A and 4B are diagrams illustrating an example of a preview screen.
Figure 4B:
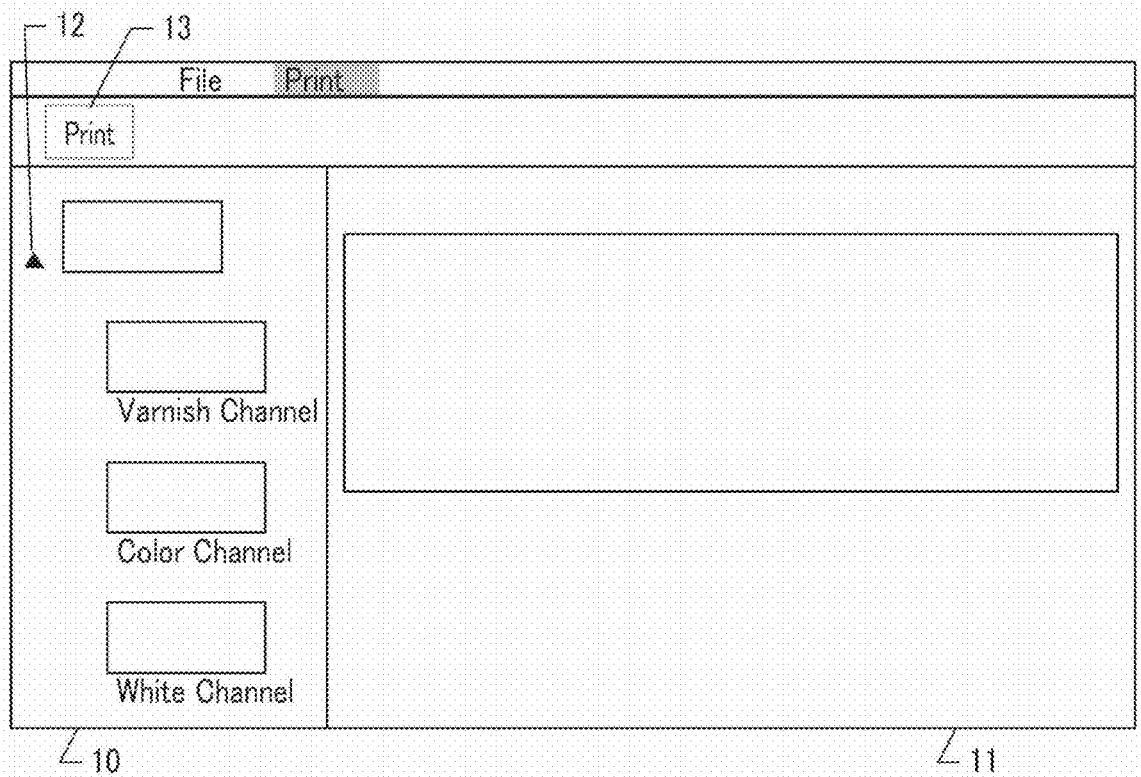

FIGS. 4A and 4B are diagrams illustrating an example of a preview screen. The preview screen includes a version selecting section 10 for selecting a preview image of a desired version from among a plurality of preview images generated for an image of the single prn file and a preview image display section 11. A thumbnail of a preview image is displayed in the version selecting section 10, and the preview image is displayed in the preview image display section 11. Note that the thumbnail is generated by further reducing a size of the preview image generated by the function of the processing section 220b, for example. In an initial state of the preview screen, as illustrated in FIG. 4A, the entire preview image is automatically selected, and the processor 220 displays the entire preview image in both the version selecting section 10 and the preview image display section 11.

In the state illustrated in FIG. 4A, when a developing button 12 is selected, the processor 220 displays thumbnails of the preview images of the individual versions in the version selecting section 10 as illustrated in FIG. 4B. Here, the processor 220 displays only a version of a print target based on the ink color information. When the thumbnails of the preview images of the individual versions are displayed in the version selecting section 10 in addition to the entire preview image as illustrated in FIG. 4B, the processor 220 displays the preview mage of the selected version in the preview image display section 11.

The preview screen includes a print button 13. When the print button 13 is selected, the processor 220 prints the prn file displayed in the preview screen. Specifically, the processor 220 drives the print section 260 so as to execute printing based on the halftone data of the ink colors specified to be used for the printing in accordance with the ink color information.

2. Print Job Generating Process

Figure 5:
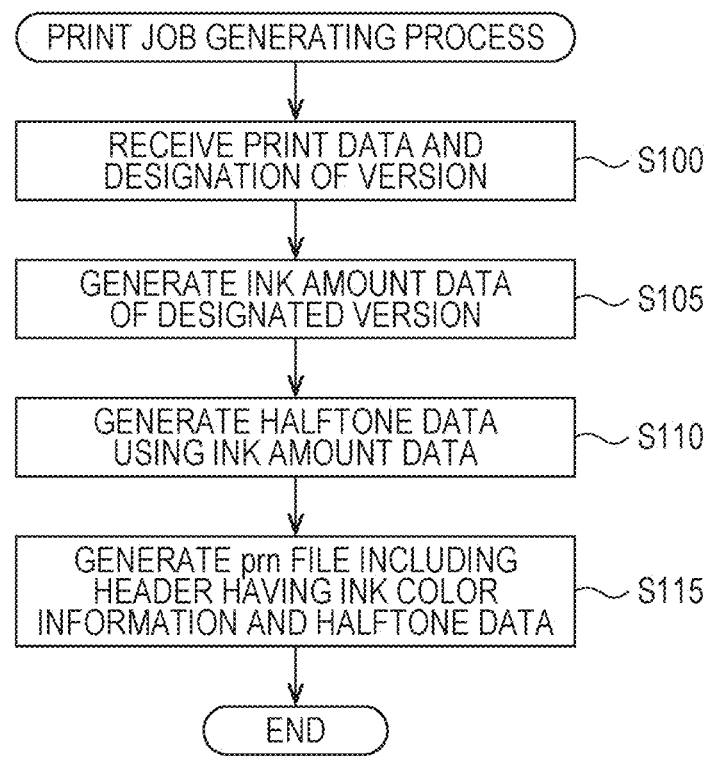
FIG. 5 is a flowchart of a print job generating process.

FIG. 5 is a flowchart of the print job generating process executed by the processor 120 of the print job generating device 100 by means of the function of the print job generating section 120a. The print job generating process is started when the user of the print job generating device 100 activates the print job generating program. When the print job generating process is started, the processor 120 receives print data and a designation of a version by means of the function of the print job generating section 120a (step S100). Specifically, the processor 120 receives a file of a print target. Furthermore, the processor 120 displays information indicating that at least one of color, white, and varnish is designated as a version of a print target in the screen of the UI section 140 for the print of the received file. When the user designates a version to be printed and an instruction for generating a print job is received, the processor 120 generates ink amount data of the designated version by means of the function of the print job generating section 120a (step S105). Specifically, the processor 120 generates ink amount data of individual ink colors of the version designated as the print target in accordance with gradation values of the colors included in the file of the print target.

Subsequently, the processor 120 generates halftone data using the ink amount data (step S110). Specifically, the processor 120 performs a halftone process on the ink amount data of the designated version so as to obtain halftone data. Furthermore, the processor 120 generates halftone data in which 0 is set to pixels for versions that are not designated. Subsequently, the processor 120 generates a prn file including a header having ink color information added thereto and the halftone data (step S115). Specifically, the processor 120 sets a value indicating whether print is to be performed to individual flags of the ink color information based on the designation of the version of the print target received in step S100. Thereafter, the processor 120 generates a header including the ink color information and arranges the halftone data generated in step S110 after the header in order illustrated in FIG. 2. In this way, the processor 120 generates a prn file serving as a print job. The generated prn file is supplied to the image forming device 200 by means of a function of the transmission section 120b.

3. Print Process

Figure 6:
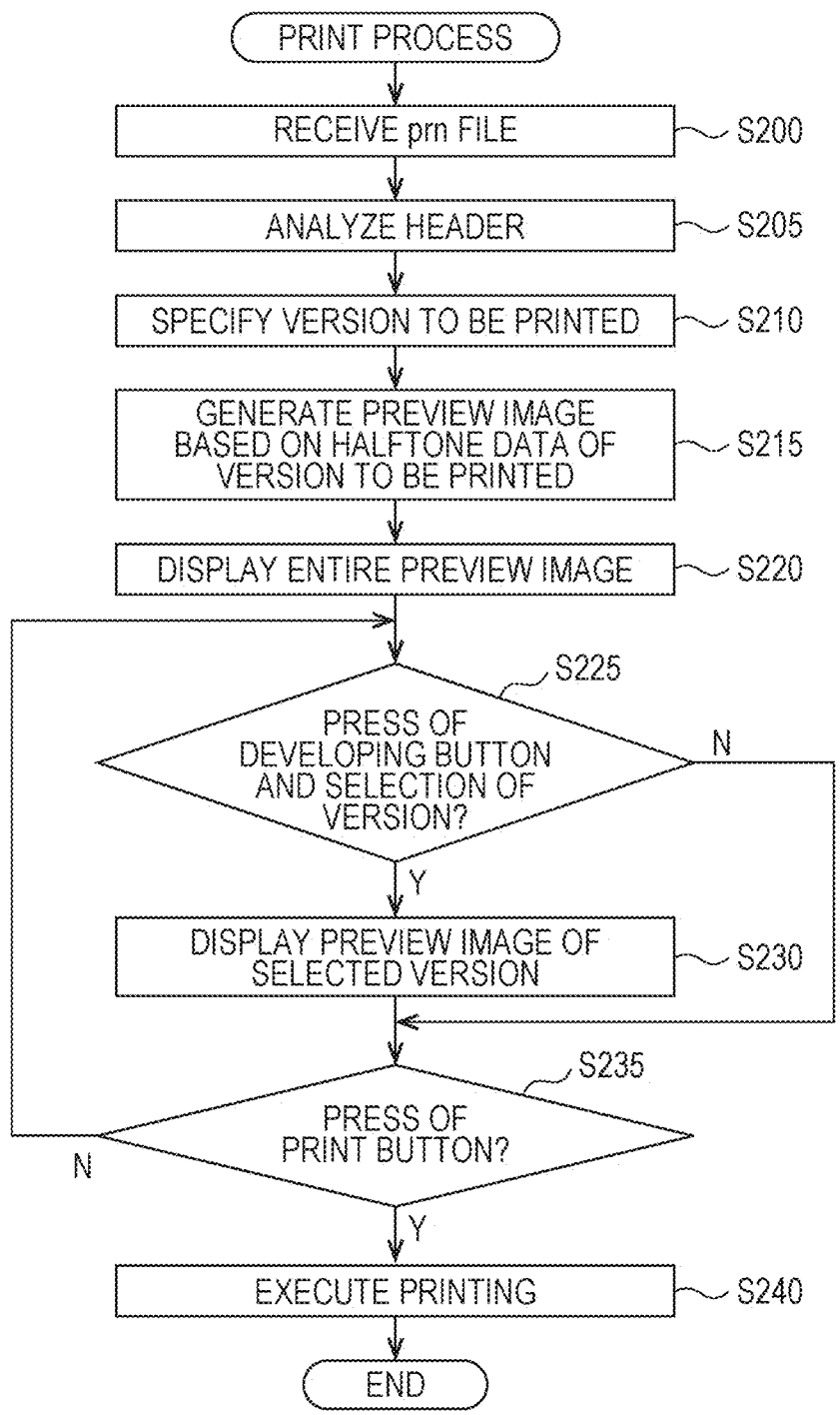
FIG. 6 is a flowchart of a print process.

FIG. 6 is a flowchart of the print process executed by the processor 220 of the image forming device 200. The processor 220 receives a prn file by means of a function of the reception section 220a and stores the prn file in the nonvolatile memory 230. When the user selects the prn file recorded in the nonvolatile memory 230, the processor 220 starts the print process. When the print process is started, the processor 220 receives the prn file by means of a function of the processing section 220b (step S200). Specifically, the processor 220 obtains the prn file from the nonvolatile memory 230 into the RAM as a print job. Here, a portion of the prn file corresponding to the header is stored in the RAM.

Subsequently, the processor 220 analyzes the header of the prn file by means of a function of the processing section 220b (step S205) and specifies a version to be printed (step S210). Specifically, the processor 220 analyzes content of the header of the prn file stored in the RAM, obtains the ink color information included in the header, and specifies a version to be printed from among the color version, the white version, and the varnish version based on the ink color information.

Subsequently, the processor 220 generates a preview image based on the halftone data of the version to be printed by means of a function of the processing section 220b (step S215). Specifically, the processor 220 generates a file of a bitmap format indicating a preview image of the version to be printed and a file of a bitmap format indicating an entire preview image and stores the files in the nonvolatile memory 230. Content of the process in step S215 will be described in detail hereinafter. Thereafter, the processor 220 displays the entire preview image by means of a function of the display controller 220c (step S220). Specifically, the processor 220 displays the entire preview image as illustrated in FIG. 4A.

Subsequently, the processor 220 determines whether a developing button has been pressed and a version has been selected by means of a function of the display controller 220c (step S225). When it is determined that the developing button has been pressed and a version has been selected, the processor 220 displays a preview image of the selected version by means of a function of the display controller 220c (step S230). Specifically, when the developing button 12 illustrated in FIG. 4A is pressed, the processor 220 displays thumbnails of preview images of individual versions to be printed below a thumbnail of the entire preview image in the block selecting section 10 as illustrated in FIG. 4B. When one of the thumbnails of the preview images of the individual versions is selected, the processor 220 displays a preview image of the selected version in the preview image display section 11.

After step S230 is executed or when it is not determined that the developing button 12 has been pressed in step S225, the processor 220 determines whether the print button 13 has been pressed (step S235). When it is not determined that the print button 13 has been pressed, the process returns to step S225. When it is determined that the print button 13 has been pressed in step S235, the processor 220 executes printing (step S240). Specifically, the processor 220 drives a print head of the print section 260 based on the halftone data of the ink colors specified to be used for the printing in accordance with the ink color information and causes the transport mechanism to transport a print medium so as to execute printing.

3-1. Preview Image Generating Process

Figure 7:
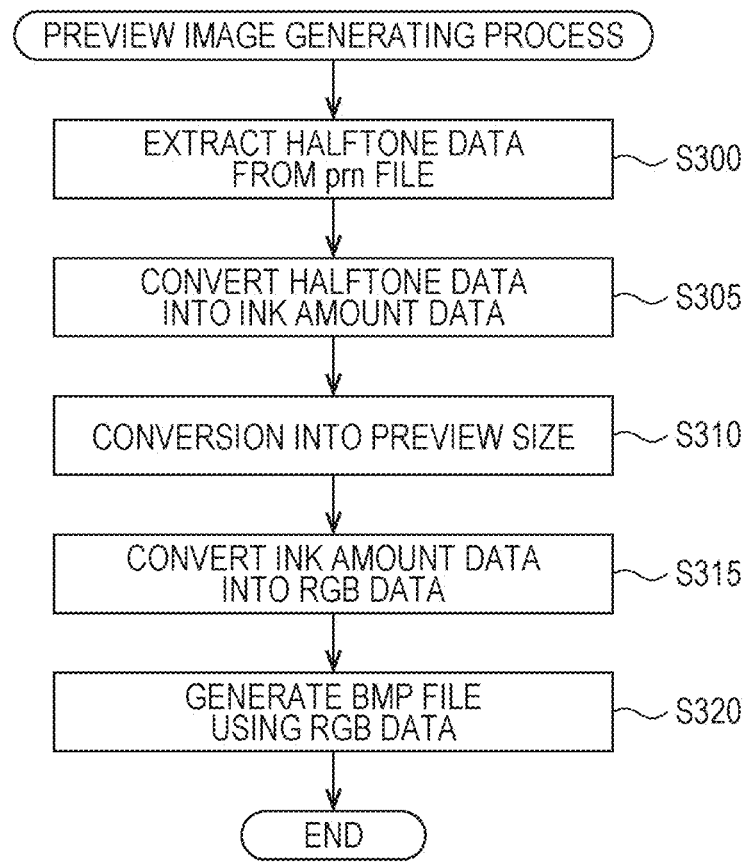
FIG. 7 is a flowchart of a preview image generating process.

FIG. 7 is a flowchart of the preview image generating process executed in step S215 in the print process illustrated in FIG. 6 in detail. When the preview image generating process is started, the processor 220 extracts the halftone data from the prn file (step S300) Specifically, the halftone data following the header is read in turn from the top into the RAM, and the halftone data of an ink color of the version specified as the print target is extracted to be converted into ink amount data.

Subsequently, the processor 220 converts the halftone data into the ink amount data (step S305). Specifically, the processor 220 performs conversion into an ink amount conversion value in accordance with an ink droplet size for each pixel to which an ink droplet of one of S, M, and L sizes is ejected and performs conversion into an ink amount of 0 for each pixel to which an ink droplet is not ejected.

Thereafter, the processor 220 performs conversion into a preview size (step S310). Specifically, the processor 220 reduces vertical and horizontal sizes of the ink amount data while an aspect ratio is maintained so that the sizes are accommodated in a predetermined size. Then the processor 220 converts the ink amount data obtained after the conversion into a preview size into RGB data (step S315). That is, the processor 220 converts the ink amount data into RGB data using an LUT.

Subsequently, the processor 220 generates a file of a BMP file format using the RGB data (step S320). Specifically, the processor 220 generates a file of a general bitmap format using the RGB data generated in step S315.

4. Other Embodiments

The foregoing embodiment is merely an example for embodying the present disclosure and various other embodiments may be employed. For example, as the image processing device, a printer or a multifunction peripheral having a print function may be assumed. Furthermore, the image processing device may be a personal computer, a tablet terminal, a smartphone, or the like that functions as a print job generating device generating a print job.

The processing section at least generates a preview image by converting raster image data of individual ink colors of color inks and special color inks into an RGB bitmap format. The color ink may represent a color of a certain color region by combination of inks constituting the color ink, and lightness of the color ink may be controlled. The special color inks are used for increasing a specific range of the color region or performing printing of a specific purpose. The special color inks may include a red ink and a metallic ink.

The raster image data may be ink amount data for individual ink colors or halftone data generated by performing the halftone process based on the ink amount data as long as the raster image data are provided for individual ink colors. In addition to the method using the LUT, a method for performing a calculation using a specific conversion function may be employed as the method for assigning RGB values to individual pixels based on the raster image data of the individual ink colors.

In the processing section, although a configuration in which half tone values (S, M, L) are converted into ink amount values of the one-to-one relationship, such as (100, 180, 255), is employed in the foregoing embodiment, the values (S, M, L) after the conversion may be changed within a predetermined range in accordance with a distribution state of surrounding halftone values, for example.

Note that, in the preview image generating process described in the foregoing embodiment, the process in step S305 and the process in step S310 may be replaced by each other.

The file of the bitmap format may have an extension of PNG or an extension of BMP. In particular, a BMP file has high versatility.

In the foregoing embodiment, an entire preview image, a preview image of a color version, a preview image of a white version, and a preview image of a varnish version are generated in the example in which the color version, the white version, and the varnish version are all print targets. Specifically, an entire preview image and preview images of individual versions are generated. However, a preview image may be generated by combining a smaller number of the versions. Accordingly, in the example described above, a preview image generated by combining the color version and the white version, a preview image generated by combining the white version and the varnish version, and a preview image generated by combining the varnish version and the color version may be further generated. Then the display controller may display, when a plurality of versions may be selected as preview targets and when a plurality of versions are selected, a preview image in accordance with a combination of the selected versions.

Furthermore, a computer executable program and a computer executable method may be employed as described in the present disclosure. Furthermore, the system, the program, and the method described above may be realized as a solo device or realized using components included in a plurality of devices, and various modes are included in the present disclosure. Furthermore, various modifications may be appropriately made, such as a configuration in which a portion is realized by software or a portion is realized by hardware. Furthermore, the present disclosure includes a recording medium for a program controlling the system. The recording medium for a program may be a magnetic recording medium, a semiconductor memory, or any recording medium that may be developed in the future.

What is claimed is:

1. An image processing device in which a display section is configured to be caused to display a preview image for printing, the image processing device comprising:
   a processing section configured to generate the preview image obtained by converting raster image data of each of ink colors of color inks or special color inks into an RGB bitmap format; and
   a display controller configured to cause the display section to display the generated preview image, wherein
   the processing section is configured to generate the preview image of the RGB bitmap format by combining the raster image data of the color inks and the raster image data of the special color inks, and
   in the raster image data of the special color inks, one or more ink colors different from the ink colors of the special color inks in a printed state are assigned to pixels to which the special color inks are to be ejected.

2. The image processing device according to claim 1, wherein
   the processing section is configured to assign, based on the raster image data of each of the ink colors, RGB values to individual pixels.

3. The image processing device according to claim 1, wherein
   the special color inks include a white ink and a varnish ink.

4. The image processing device according to claim 1, wherein
   the processing section is configured to generate the preview image of the RGB bitmap format for a group including at least one ink color.

5. The image processing device according to claim 1, wherein
   the preview image is generated in a BMP file format.

6. The image processing device according to claim 1, wherein
   the raster image data is halftone data including a value indicating whether an ink droplet is to be ejected to a pixel or ink amount data of each of the ink colors.

7. A preview image display method for causing a display section to display a preview image for printing, the preview image display method comprising:
   generating the preview image by converting raster image data of an ink color of a color ink or a special color ink into an RGB bitmap format; and
   causing the display section to display the generated preview image, wherein
   the preview image of the RGB bitmap format is generated by combining the raster image data of the color inks and the raster image data of the special color inks, and
   in the raster image data of the special color inks, one or more ink colors different from the ink colors of the special color inks in a printed state are assigned to pixels to which the special color inks are to be ejected.

8. A non-transitory computer-readable storage medium storing a preview image display program that causes a computer to realize a function of causing a display section to display a preview image for printing, the program causing the computer to function as:
   a processing section configured to generate the preview image obtained by converting raster image data of an ink color of a color ink or a special color ink into an RGB bitmap format; and
   a display controller configured to cause the display section to display the generated preview image, wherein
   the processing section is configured to generate the preview image of the RGB bitmap format by combining the raster image data of the color inks and the raster image data of the special color inks, and
   in the raster image data of the special color inks, one or more ink colors different from the ink colors of the special color inks in a printed state are assigned to pixels to which the special color inks are to be ejected.

* * * * *